Feb. 20, 1934.   J. TELLER ET AL   1,948,402
DETACHABLE UNIT, TABLE TOP ELECTRIC RANGE
Filed Oct. 23, 1931   2 Sheets-Sheet 2
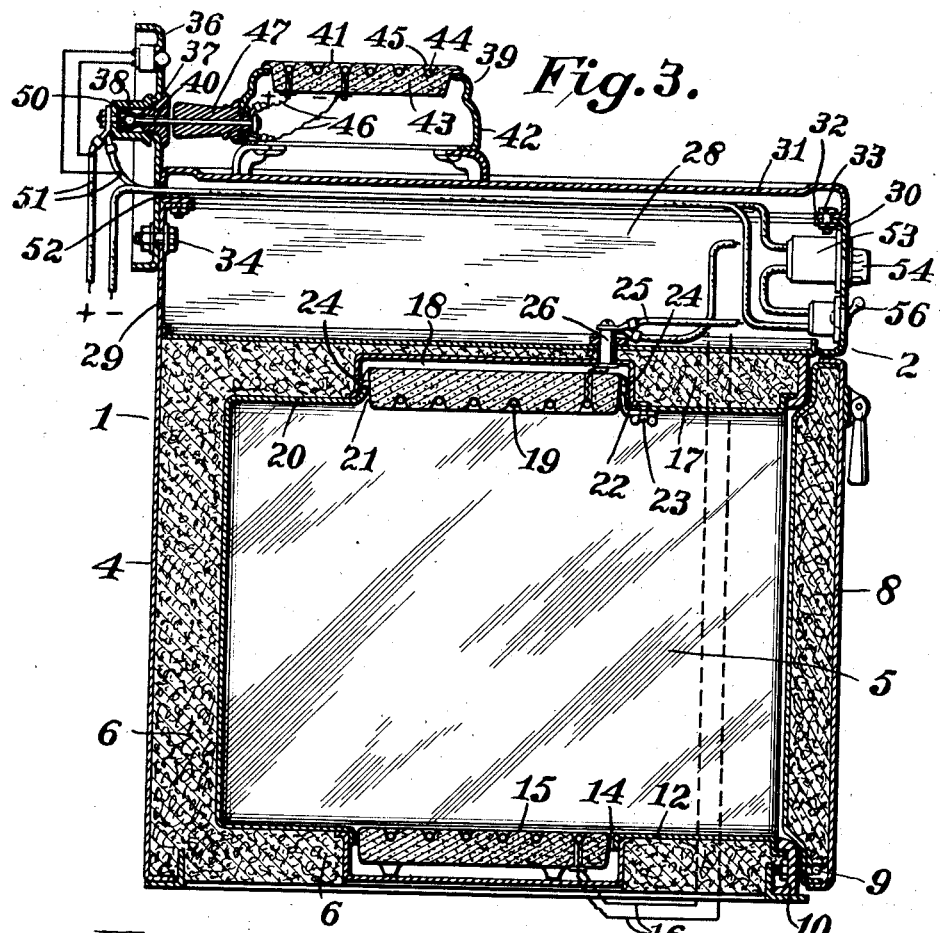
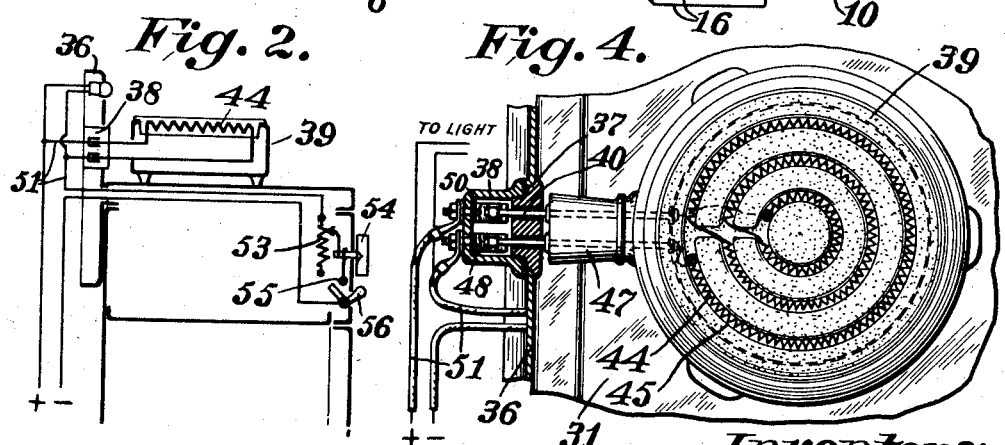
Inventors:
Jacob Teller,
Arthur P. Schulz,
By
Atty.

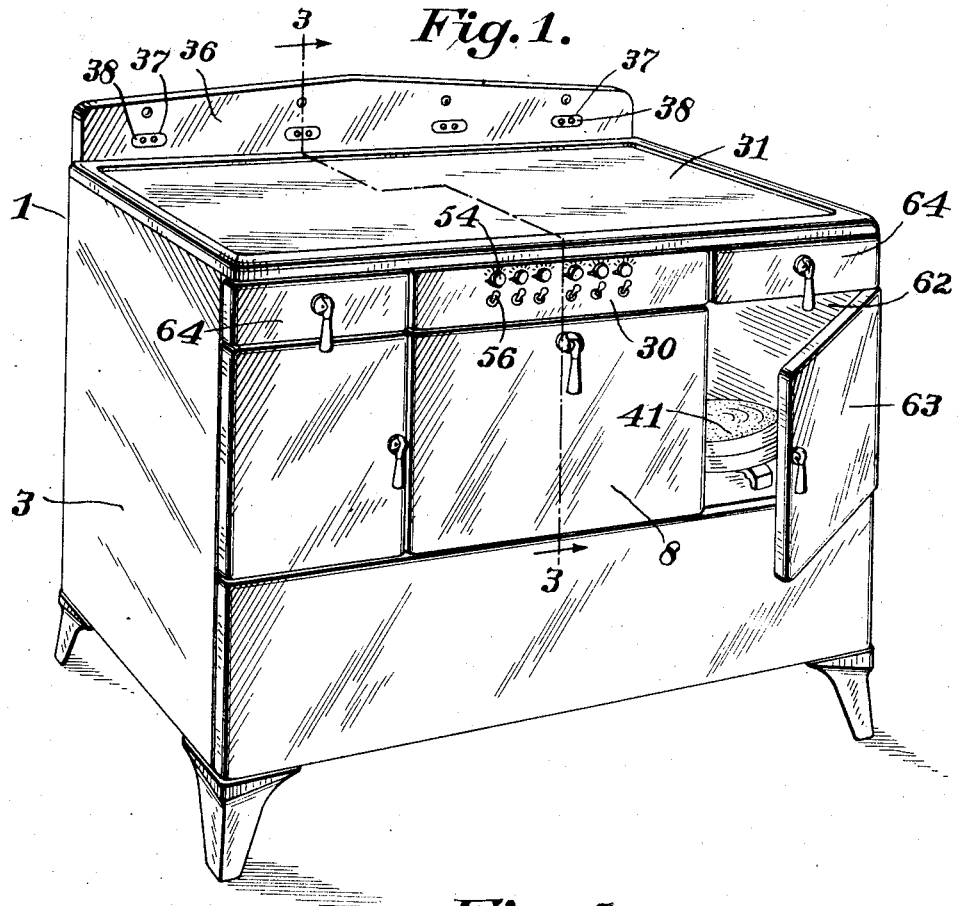
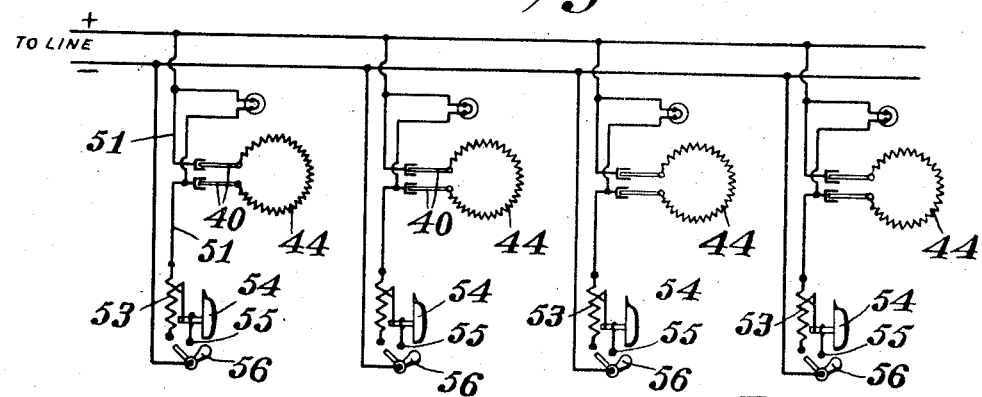

Patented Feb. 20, 1934

1,948,402

UNITED STATES PATENT OFFICE 1,948,402

DETACHABLE UNIT, TABLE TOP ELECTRIC RANGE

Jacob Teller, New Rochelle, and Arthur P. Schulz, New York, N. Y., assignors, by mesne assignments, to Teller Stove Designing Corporation, a corporation of New York Application October 23, 1931. Serial No. 570,674

1 Claim. (Cl. 219—37)

This invention relates to electric stoves and ranges, and particularly ranges of the domestic type, and is designed to provide an electric cooking apparatus in which the electric heating elements are independently and severally detachable from the range body.

The principal object of the invention is to provide an electric cooking range in which the upper surface may be employed either for supporting the electric heating units, or these may be readily detached to provide a plane table top, or working surface, free of any heating elements or other obstructions which would interfere with the free use of the apparatus for such purposes as that to which the usual kitchen table or cabinet is put.

A further object resides in the idea of providing an electric cooking apparatus in which various types of electric cooking units may be independently and interchangeably employed, such for instance as hot plates, waffle irons, or any other cooking utensils usually found in the kitchen and which are usually placed upon a heating element forming an integral part of the stove or range.

A further object is the provision of an electric cooking range in which the heating elements for the oven are readily detachable when occasion requires.

A further object resides in a construction of cooking range, in which provision is made for storage of the electric cooking elements when not in use, and whereby they may all be concealed from view when the entire table top is desired to be employed for ordinary table or buffet use.

Figure 1 is a front perspective view of the electric range;

Figure 2 is a diagrammatic view illustrating the wiring circuit for one of the detachable heating units;

Figure 3 is a transverse sectional view of the range on substantially the line 3—3 of Figure 1;

Figure 4 is a detail plan view of one of the electric heating elements, with the electric receptacle on the range, shown in section, and Figure 5 is a wiring diagram illustrating one form of circuit which may be employed with our range.

Referring now more specifically to the drawings by numerals of reference, 1 represents the range or stove, embodying front walls 2, end walls 3, and a rear wall 4, the intermediate portion of the range constituting the oven 5, the walls of which are suitably insulated as by the insulation 6, the particular construction, insofar as details are concerend, may take any well known and appropriate form, that portion of the front of the stove which forms the oven being closable by an insulated door 8, hinged at 9 along its lower edge to a door frame channel member 10.

The floor 12 of the oven is provided with a recess 14, in which is suitably mounted the electric heating element 15, from which lead the conductor wires 16. The upper wall or roof of the oven 17, is also provided with a recess 18, in which is mounted the top heating element 19. The inner plate 20 of the upper wall 17 is provided with an inwardly extending flange or lip 21 at one side, while at another point it is provided with a clip or bracket 22, secured in place by a screw or wing nut 23. The heating unit is provided with a shoulder or flange 24, one portion of which rests upon the lip 21, while another portion, probably diametrically opposed rests upon the detachable clip 22. This construction permits the heating element to be suspended in such a manner that, by removing the clip 22, it may be easily removed for any purpose desired, it of course being necessary to first disconnect the conductor wires 25 from the insulating sleeve 26 and lead wire to the heating element.

Formed preferably as an integral part of the stove body but not necessarily so, is an upper section, designated generally by the numeral 28, this section comprising a rear wall 29, side walls and a front control or instrument panel 30, upon which walls and panel is supported an enameled and preferably detachable top table member 31, having flanges 32, whereby it may be fastened as by stove bolts or other suitable fastening means 33.

Mounted upon the rear of the top table member 31, preferably by attaching it to the rear wall of the upper section, as by bolts or other fastening means 34, is a panel 36, perpendicular to the plane of the said table top. This panel is provided with a longitudinal series of openings 37, in each of which is mounted an electric outlet 38 of a generally conventional construction, such changes in form being made where necessary to accommodate the receptacle to the particular type of plug 40 carried by the associated electric heating unit 41. A pilot light 60 having leads 61 is connected in the circuit of the outlet plug 40 to indicate when the current is turned on.

As shown, the heating unit is here embodied in an electric hot plate of generally conventional type, and comprises the support 42 for the insulating plate 43 in the facial grooves 44 of which is disposed the resistance heating wire 45, the conductor wires 46 from which lead to the positive and negative plugs passing through the hot plate handle 47, the extensions of which, when the hot plate is in use, engage the corresponding positive and negative clips 48 and 50 in the outlet receptacle 38.

The conductor wires 51 from each receptacle 38 are passed through openings 52 in the rear wall, and lead to the rheostat 53 mounted upon the rear face of the front instrument panel 30, the rheostat being controlled by the handle 54 on the panel front.

As shown in the diagrammatic view in Figure 2, we place in the wiring circuit, for each of the heating elements, a switch 55 also mounted upon the front panel 30, said switch being controlled by a swinging operating knob 56.

While we have shown one particular form of heating unit, it is to be clearly understood that this is merely by way of illustration, and that the specific design of unit shown may take the form of various types of units, such for instance as waffle irons, electric sad irons, cooking vessels of various kinds, or in fact, any type of heater or cooker which is provided with electrical connecting means complemental to the electrical connecting means arranged on the panel. On the other hand, the electric connections may be reversed without departing from the spirit of the invention; that is to say, the plug may be arranged on the panel, while the receptacle in appropriate form, may be formed as a part of the heating unit or utensil.

In Figure 5 we illustrate one form of wiring circuit, wherein the service wires 59 are connected with the wiring for the several outlet connections for the detachable heating units and also for the oven heating units. If desired, each of the circuits may be provided with a pilot lamp 60 arranged on the panel 30 in association with each outlet connection, and in shunt with the circuit for each particular outlet.

Upon each side of the center oven are the compartments 62, having doors 63, said compartments being designed for use as storage chambers for the detachable heating units when not in operation on the table top. Above the compartments 62 may be arranged drawers 64 to contain those articles necessary and common to kitchen use.

Having thus described our invention, what we claim as new and desire to protect by Letters Patent is:

An electric stove or range comprising an upper section having side walls, a rear wall and a front wall, a detachable table top member, said upper section and table top member being provided with cooperating fastening flanges, a rear panel detachably connected with the rear wall of said upper section, a plurality of electric outlets carried by said panel, and a plurality of electric heating devices interchangeably connectible with any of said electric outlets, a main switch mounted upon said front wall and a rheostat mounted upon said front wall in series with said switch and said heating devices.

JACOB TELLER.
ARTHUR P. SCHULZ.